Jan. 18, 1944.  R. A. NORBOM  2,339,288
CONTAINER TRANSFER EQUIPMENT FOR VEHICLES
Filed Sept. 1, 1942  5 Sheets-Sheet 1
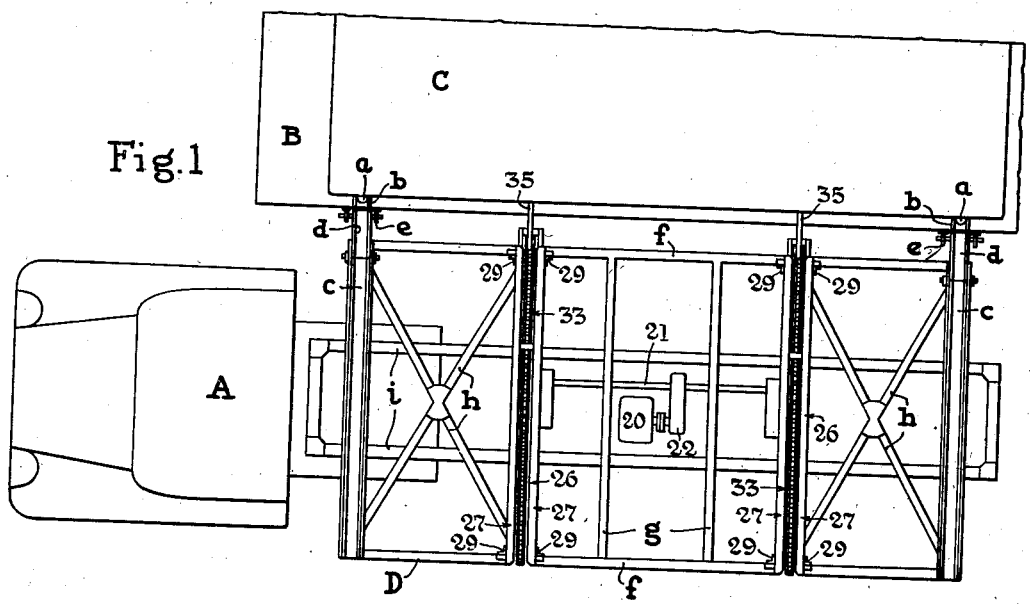
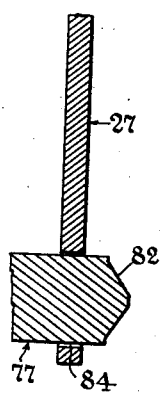
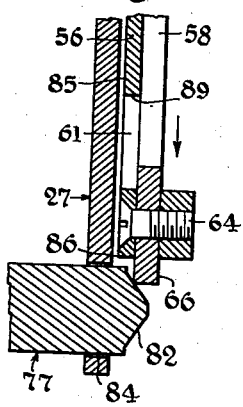
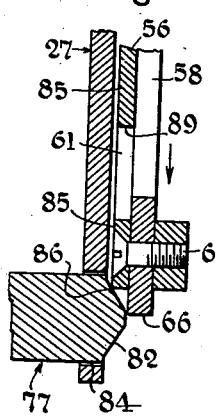
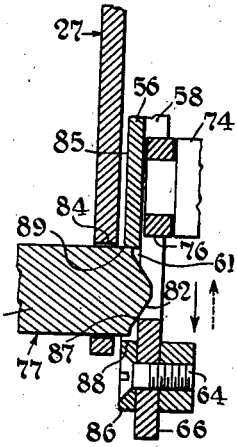
Inventor
Ragnar A. Norbom
Attorney.

Jan. 18, 1944.  R. A. NORBOM  2,339,288
CONTAINER TRANSFER EQUIPMENT FOR VEHICLES
Filed Sept. 1, 1942  5 Sheets-Sheet 2
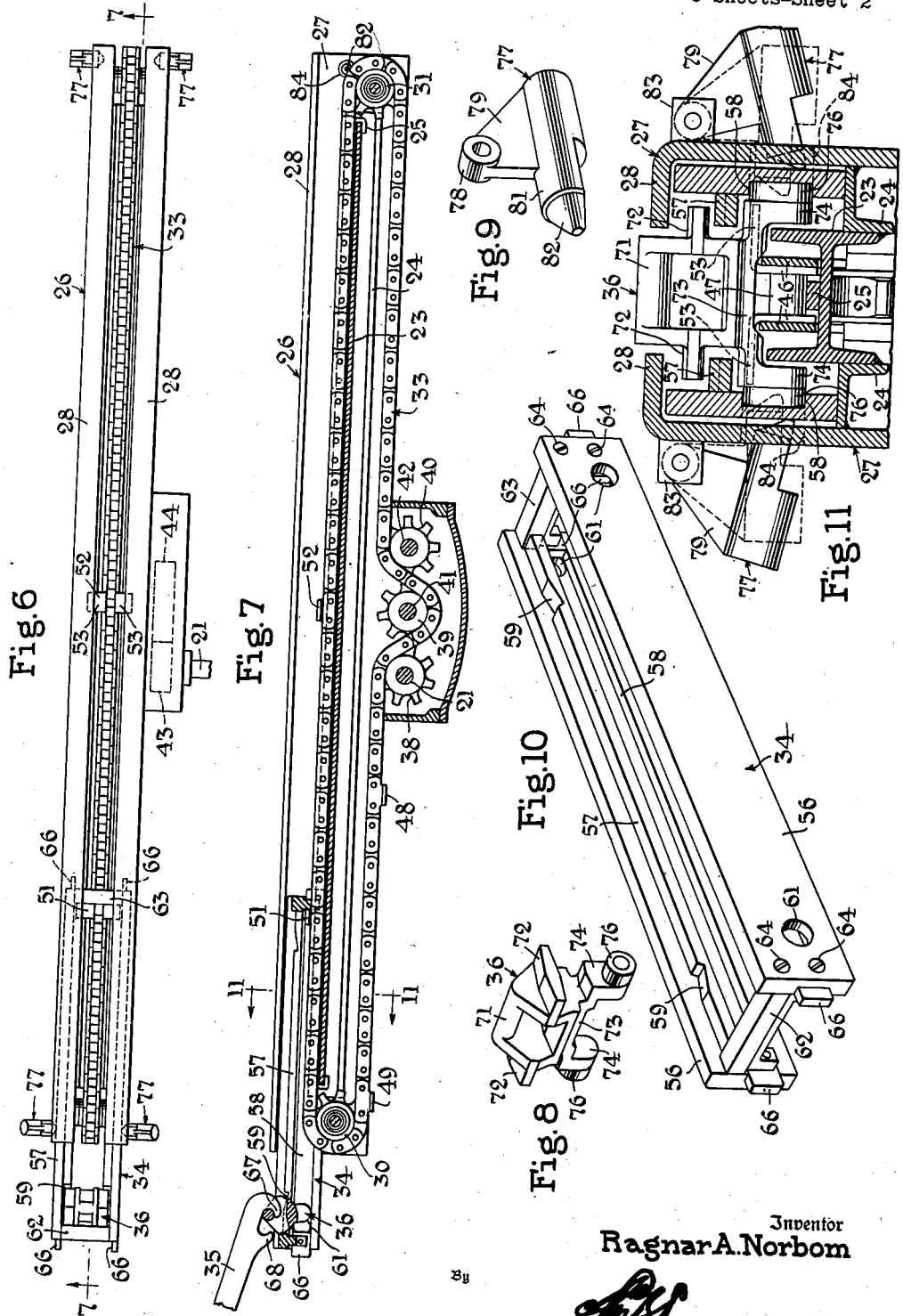
Inventor
Ragnar A. Norbom
Attorney.

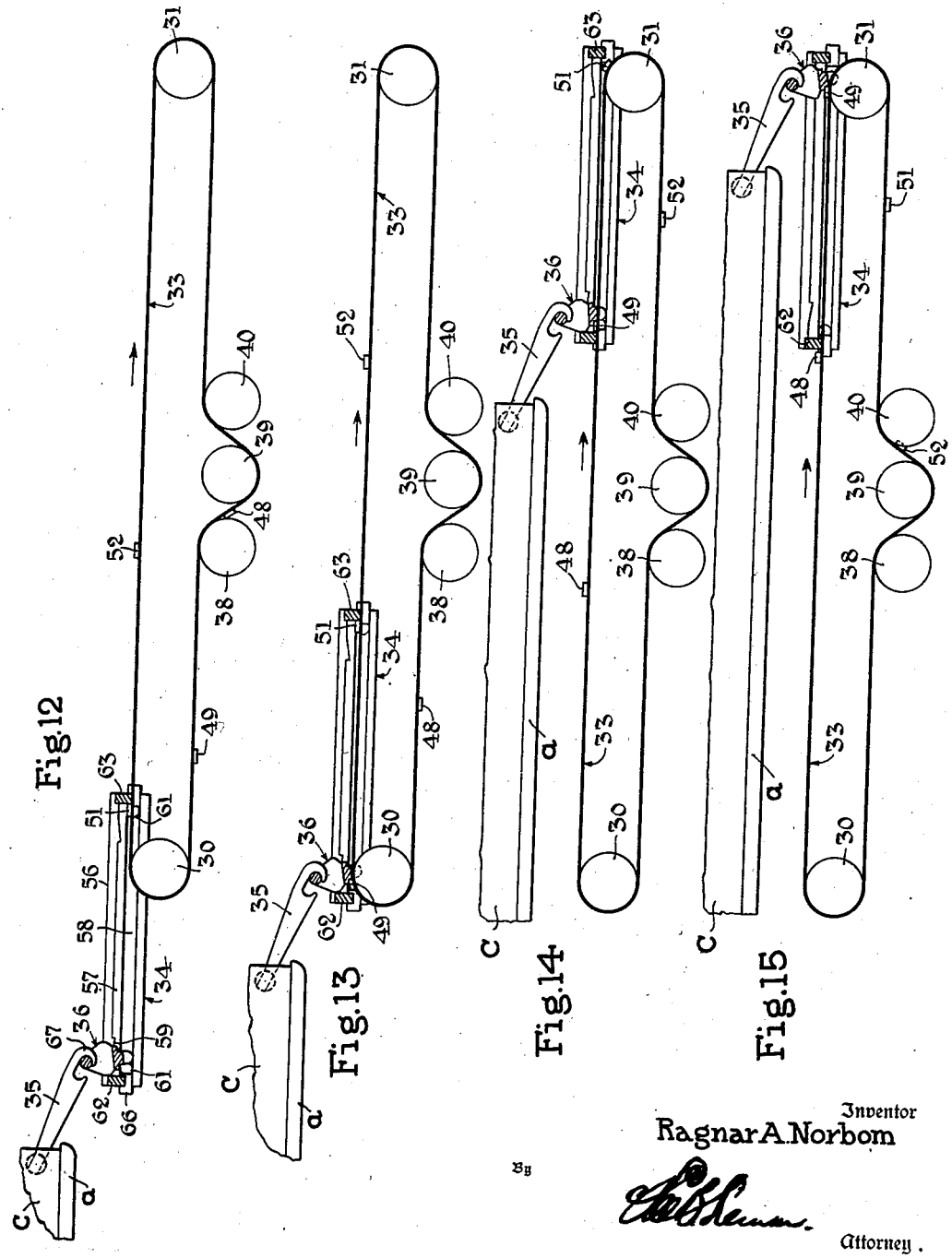

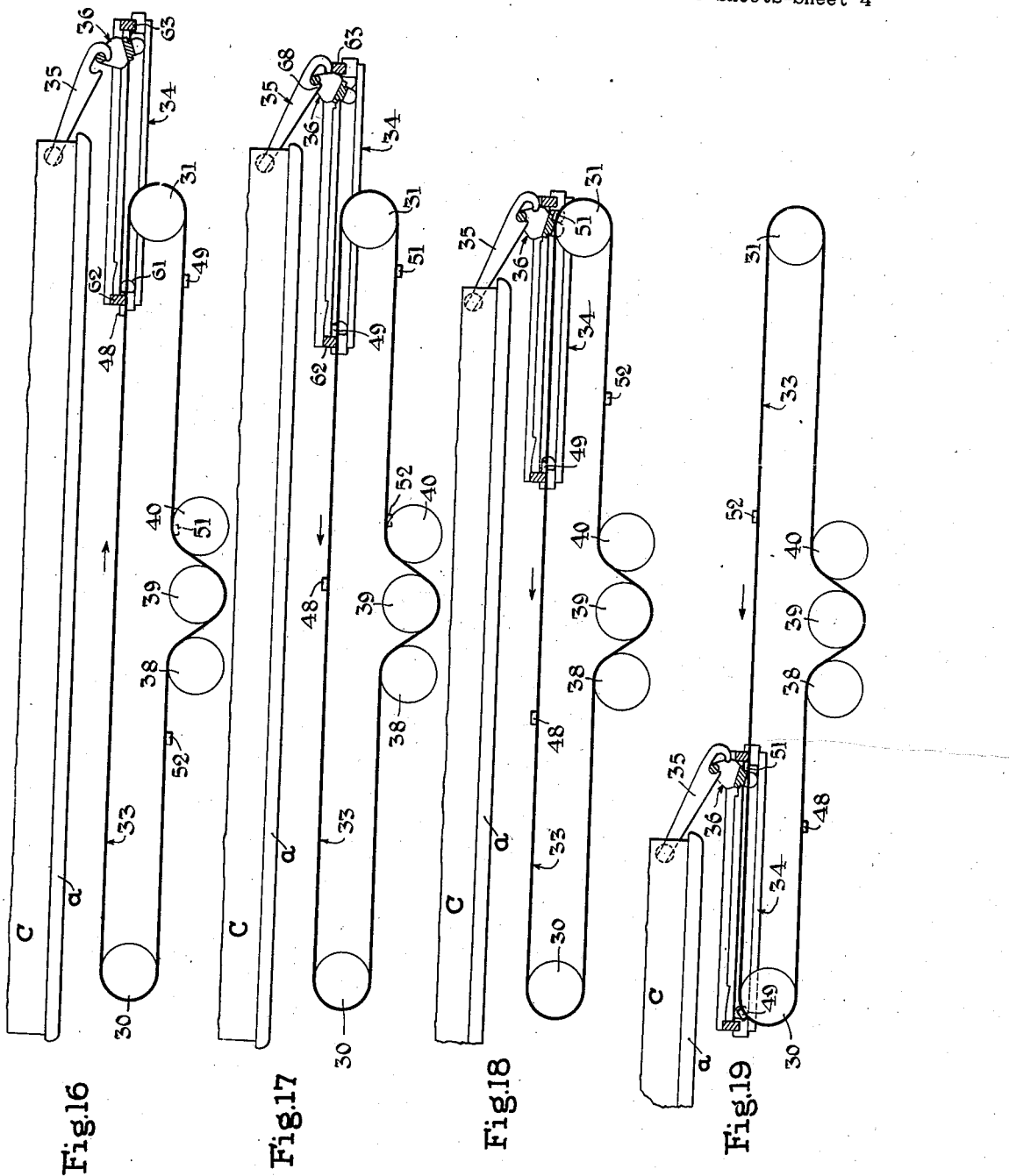

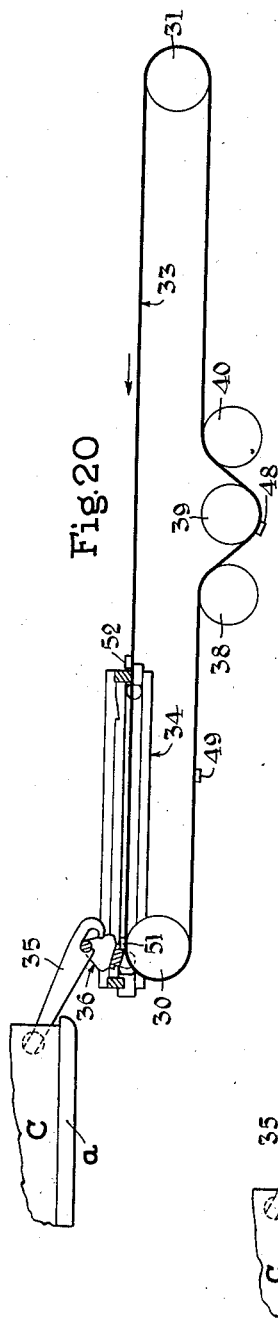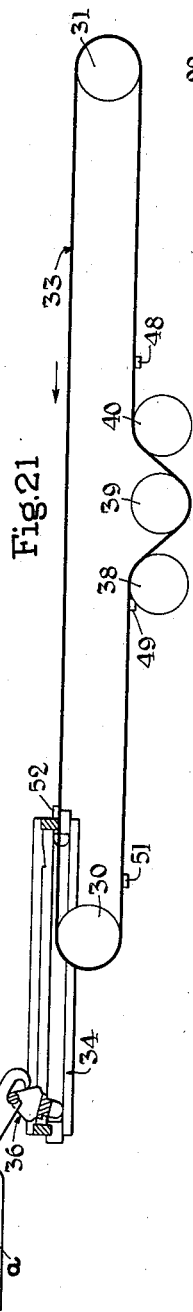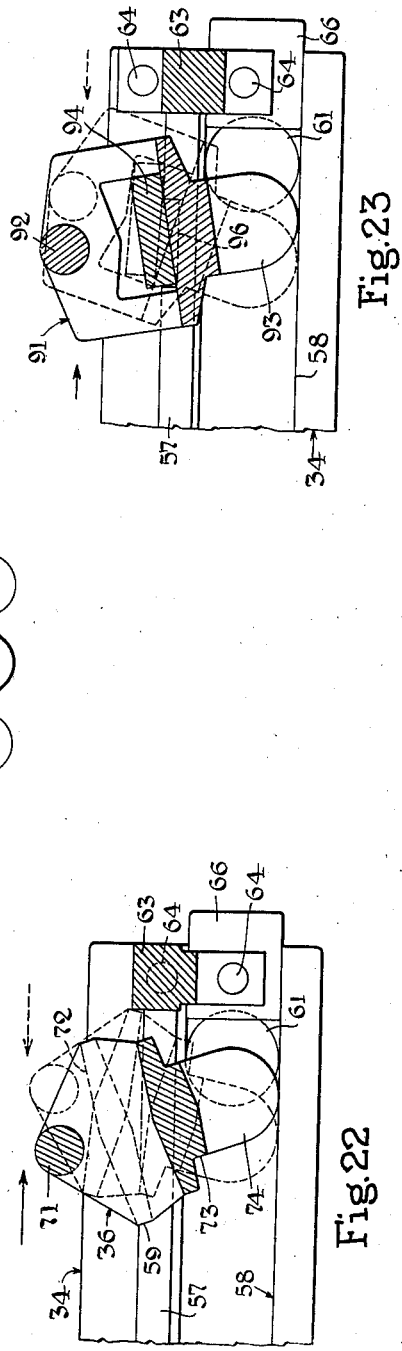

Patented Jan. 18, 1944

2,339,288

UNITED STATES PATENT OFFICE 2,339,288

CONTAINER TRANSFER EQUIPMENT FOR VEHICLES

Ragnar A. Norbom, New York, N. Y., assignor to National Fitch Corporation, a corporation of Delaware Application September 1, 1942, Serial No. 456,945

23 Claims. (Cl. 214—83)

This invention relates to equipment for transferring freight containers to and from vehicles. The equipment is adapted to be mounted in or on the load support, platform, frame or chassis of a vehicle and to transfer freight containers to the vehicle from an adjacent platform or other support at the side of which the vehicle may be parked, as well as from the vehicle to an adjacent platform or support. The equipment may be mounted on various types of vehicles, including highway trucks, truck trailers, and railroad cars. A vehicle having the equipment of this invention may be used as a carrier in the hauling of freight containers between a warehouse loading platform and a railroad car or other vehicle, such as a conventional highway truck. A vehicle having the present freight transfer equipment may also be used in passing freight containers between a vehicle not so equipped and a freight car. The freight containers to be transferred by the present equipment may be relatively large in size and may weigh, when loaded, a number of tons. The present equipment has particular usefulness in the transfer of containers for less than a freight car shipment, but of a size to hold as much as a quarter or a half of a freight car load. The freight container may also be of a size and form corresponding to a demountable load carrying body for the truck, trailer or other vehicle having the equipment of this invention.

In a preferred embodiment of this invention, the transfer equipment is normally disposed on a vehicle and within its outer limits, so that no part of the equipment extends beyond the vehicle during its use as a carrier in hauling operations. Yet the equipment in simple manner is adapted to reach beyond a side of the vehicle in shifting a freight container from an adjacent platform to the vehicle, as well as from the vehicle to an adjacent platform. The equipment in a preferred form is also adapted to reach beyond the opposite side of the vehicle, as for example, in completing a vehicle loading operation so that the freight container being transferred may be properly centered on the vehicle although the container is substantially the same in size as the load support or platform of the vehicle. A preferred embodiment of this invention also provides for transfer of a container to or from the vehicle in a substantially continuous (uninterrupted) operation which requires only two controlling movements by the attendant, once the equipment is connected to the container. One controlling movement initiates the transfer operation. The other controlling movement terminates action of the equipment when the container transfer operation is completed.

It is an object of this invention to provide novel container transfer equipment which is characterized by its simplicity in construction and operation and by its efficiency, durability and dependability in service.

It is a further object to provide novel container transfer equipment which is relatively simple and inexpensive to manufacture.

A further object is to provide novel freight container transfer equipment for vehicles, which equipment may be readily operated in proper manner and at the same time requires no special skill or training on the part of the attendant.

Another object is to provide a vehicle with novel container transfer equipment, the overall dimension of which in hauling operations is not in excess of the width of the vehicle, but which in loading and unloading operations is effective to provide complete transfer of the container to or from the vehicle and from or to a platform adjacent the vehicle.

A still further object is to provide freight container transfer equipment which requires of its attendant only his control of the power for driving the equipment to complete a loading or unloading operation for the vehicle having such equipment once the equipment is connected to a freight container and placed in operation.

Still another object is to provide freight container transfer equipment which, although of relatively simple construction, is sturdy and efficient, and also adapted to transfer a container to or from a vehicle having such equipment in a substantially continuous and uninterrupted operation which requires only two controlling movements of the attendant to initiate and complete a transfer operation, once the equipment is connected to the container.

Other objects and advantages of this invention will be readily apparent from the following description, the appended claims, and the accompanying drawings which illustrate a preferred embodiment of the invention.

In the drawings,

Figure 1 is a plan view of a tractor-trailer type of highway truck provided with transfer equipment embodying this invention. The plan view of Figure 1 also includes a portion of an adjacent railway car and a freight container, the container being on the car and connected to the transfer equipment of the truck.

Figures 2 through 5, inclusive, are detail views on enlarged scale and illustrate different stages in the operation of one of the arm or slide locking devices of Figure 1.

Figure 6 is a top plan view on enlarged scale of one of the drive transmitting mechanisms of Figure 1 and omits the push-pull bar for purposes of illustration.

Figure 7 is a sectional view taken on line 7—7 of Figure 6 and includes the push-pull bar.

Figures 8, 9 and 10 are respectively perspective views on enlarged scale of parts of the mechanism of Figures 6 and 7.

Figure 11 is a cross-sectional view on enlarged scale and taken on line 11—11 of Figure 7.

Figures 12 through 16 are, in general, diagrammatic views to illustrate successive stages during the operation of the equipment of Figures 1 through 11 in transferring a freight container from the railway car to the highway truck of Figure 1.

Figures 17 through 21 are, in general, diagrammatic views to illustrate successive stages during the operation of the equipment of Figures 1 through 11 in unloading a freight container from the highway truck of Figure 1.

Figure 22 is a view on enlarged scale of a detail of the mechanism of Figures 6 and 7.

Figure 23 is a view corresponding to Figure 22 and illustrates a modification of the construction shown in Figure 22.

Referring now to the accompanying drawings in explaining a preferred embodiment of this invention, Figure 1 shows a vehicle or highway truck A parked adjacent a platform B which supports a merchandise or freight container C. The vehicle A may be of the truck-trailer type as illustrated. The load support of the trailer may be the frame D of the trailer chassis or a load supporting platform of any conventional construction. The platform B may be the platform of a freight or railway car, the loading platform of a warehouse, or the load support or platform of a second truck. The container C may be a demountable trailer body, or a freight car section such as a quarter or half car section, or a warehouse container for holding a substantial quantity of merchandise, such as a truck load. The container C may also be of the open or closed top type. For convenience, the container C will be called a "freight container," the latter term being used generically for containers including the types described above.

The freight container C may be provided with skid rails $a$ which are adapted to slide in and be guided by the channels $b$ on the platform B and the channels $c$ of the trailer as the container C is transferred from the platform B to the trailer or from the trailer to the platform B. The channels $b$ and $c$ may extend transversely of the platform B and the truck trailer frame D respectively, as illustrated, where the transfer operation is to be transverse of the truck A. Where the container C is to be shifted lengthwise of the platform B onto the rear end of the trailer and then lengthwise of the trailer frame D, the channels $b$ and $c$ would be correspondingly arranged on the railway car B and the trailer frame D respectively to facilitate such transfer.

The trailer frame D is provided with members $d$ which serve as bridges between the channels $b$ and $c$ in the transfer of the freight container C. Each bridge member $d$ may be of such length that it may extend varying distances beyond the trailer frame D to reach from the frame D to the platform B. The bridge members $d$ may be adjustably secured to the channels $c$ or to the trailer frame D. At their outer ends, the bridge members $d$ are adapted to be secured detachably to folding wings $e$ which are mounted on the side of the platform B. If desired, similar bridge members $d$ may be provided at both ends of each channel $c$ and provide for loading and unloading of the truck A from either of two opposite sides thereof.

When the members $d$ are in their bridging position as illustrated (Figure 1), the channels $b$ and $c$ as well as the members $d$ are in registration or alignment and provide two substantially continuous guides for the container skid rails $a$ during the transfer of the freight container C.

The trailer frame D may be mounted on the main sills $i$ (Figure 1) of the trailer chassis and may comprise longitudinal beams $f$, transverse beams $g$, and reinforcing members $h$. The beams $f$ form two opposite sides of the frame D, and the channels $c$ are shown as arranged at the front and rear sides of the frame D.

The power for transferring the freight container C onto or off of the trailer frame D is derived from a conventional type of reversible motor 20. The motor 20 drives a shaft 21 through suitable couplings and a conventional reduction gearing 22 (Figure 1). The reduction gearing 22 may include a conventional worm and worm wheel (not shown) for a purpose to be described hereinafter.

The drive of the shaft 21 may be transmitted to the freight container C by means of one or more drive transmitting mechanisms 26, each preferably extending substantially parallel to the channels $c$ on the trailer frame D. In a preferred embodiment of this invention, the trailer frame D is provided with two of the drive transmitting mechanisms 26 as illustrated in Figure 1. These two mechanisms 26 may be and preferably are identical in construction and operation, are similarly mounted and have similar connections to the driving shaft 21. It will, therefore, be necessary to describe the construction, operation, mounting and drive of only one of the two mechanisms 26.

*Support and mounting for drive transmitting mechanism*

A drive transmitting mechanism 26 is provided with a housing and support comprising a set of two spaced angle beams or angle irons 27 having inwardly extending flanges 28 at their upper edges (see Figure 11). Each angle beam 27 extends in parallel relation to the trailer channels $c$ and is supported by the main sills $i$ of the trailer chassis. The angle beams 27 and the trailer channels $c$ (Figure 1), if desired, may reinforce and be included in the trailer frame D. Each end of each angle beam 27 may be rigidly secured by means of a bracket 29 to the adjacent end of a frame beam $f$ as shown in Figure 1.

A set of two angle beams 27 is provided with a chain and slide support comprising an I-beam 23 and two angle beams 24 (see Figure 11). The I-beam 23 is positioned with its web portion extending in a substantially horizontal position and has each depending flange secured, as by welding, to a flange of an angle beam 24 as shown in Figure 11. The other flange of each beam 24 has its outer edge secured, as by welding, to the adjacent beam 27 as shown in Figure 11. A bar or strap 25 rests on and extends along the length of the web of the I-beam 23 and has its opposite ends turned under the ends of the I-beam web (see Figure 7).

The opposite ends of a set of angle beams 27 are provided with adjustably mounted sprocket wheels 30, 31.

DRIVE TRANSMITTING MECHANISM

A drive transmitting mechanism 26 includes a sprocket chain 33 for driving a slide or arm 34, a push-pull bar 35, and a drive connecting element 36 (see Figures 7, 8 and 10). The sprocket chain 33 extends over the two sprockets wheels 30 and 31 adjacent the ends of the respective angle beams 27. The lower section or reach of the chain 33 is trained over a sprocket wheel 38, under a sprocket wheel 39, and over a sprocket wheel 40 (see Figure 7). The sprocket wheels 38, 39 and 40 are mounted on shafts 21, 41 and 42, respectively. The shaft 21 is the driving shaft, being driven by the motor 20 as previously described and as illustrated in Figure 1. The sprocket wheel 38 is preferably rotatably mounted on the shaft 21, and a pinion or gear 43 (see Figure 6) is secured fast to the shaft 21. The pinion 43 meshes with a spur gear 44, which is secured to a hub that is integral with the sprocket wheel 39. The spur gear 44, the sprocket wheel 39 and the connecting hub are rotatably mounted on the shaft 41 which is preferably a stationary shaft. The sprocket wheel 40 is rotatably mounted on the shaft 42, which is also preferably a stationary shaft. The sprocket wheel 39 is, therefore, the driving sprocket for the chain 33 and the sprocket wheels 38 and 40 are idle sprockets for maintaining proper driving relation between the chain 33 and the driving sprocket 39. The chain 33 is maintained taut and in engagement with its sprocket wheels 30, 31, 38, 39 and 40 by proper adjustment of one or both of the sprocket wheels 30 and 31.

A support and guide for the upper reach of the chain 33 is provided by the I-beam 23 and the bar 25. The upper chain reach is disposed between the upstanding flanges of the I-beam 23. The bar 25 fits between the links 46, which form the opposite sides of the chain 33, to provide a rest and support for the chain rollers 47. These rollers 47 are carried by pins which pivotally connect the chain links 46. The bar 25 also serves to guide the chain links 46 as well as to space them from the I-beam 23. The chain 33 is also provided with driving lugs 48, 49, 51 and 52. Each of these chain lugs may be formed by providing laterally extending wings 53 on two opposite chain links 46 (see Figures 6 and 11). The spacing of these lugs (48, 49, 51, 52) along their chain 33 will be explained hereinafter.

Slide

The slide or arm 34 (see Figure 10) and the element 36 (see Figure 8) are adapted to provide driving connection between the chain 33 and the push-pull bar 35 (Figure 7). The arm or slide 34, which may be referred to as an elongated member, is relatively long so that it may extend or reach beyond the chain 33 and a side of the vehicle. The length of the arm or slide 34 should be such that when in a central position on the truck frame D, neither end of the arm 34 projects beyond an edge or side of the truck frame D.

In a container transfer operation, the arm 34 is adapted to be driven by the chain 33 from one to the other side of the vehicle (see Figures 12 and 16, for example) and to slide on the horizontal flanges of the angle bars 24 (see Figure 11). The arm 34 is also guided in its movement by the vertical and horizontal flanges of the angle beams 27. Thus the arm 34 is adapted for longitudinal travel in a rectilinear path from a projecting position at one side of the trailer frame D to a projecting position at the opposite side of the trailer frame D.

An arm or slide 34 (Figure 10) has its opposite sides of the same construction. The opposite ends of the arm 34 are also similarly constructed. The arm 34 comprises two plates or bars 56 forming the arm sides. Each plate 56 is provided at its inner side with a bar 57 and a groove or roller guideway 58. Both the bar 57 and the guideway 58 extend longitudinally of their plate 56. Each bar 57 adjacent each end thereof is provided with a notch or keeper 59 for a purpose to be described. Each plate 56 also is provided adjacent each end thereof with a pawl receiving aperture 61 which opens into the roller guideway 58. The arm sides or plates 56 are maintained in spaced relation by similar cross pieces or transverse members 62 and 63, the plates 56 and the transverse members 62 and 63 being rigidly secured in assembled relation as by means of screw 64. The arm 34 straddles the chain 33 with the transverse members 62, 63 overlying the chain 33 and adapted for driving engagement with chain lugs as explained hereinafter. Each end of each plate 56 is provided with a pawl tripper 66 in the form of a block which is positioned within and extends from an end of the corresponding groove or roller guideway 58. Each pawl tripper 66 is secured to its plate 56 and the corresponding transverse member (62 or 63) by means of a screw 64 (see Figure 3).

Push-pull bar

The push-pull bar 35 is adapted at one end for detachable connection to the freight container C. At its opposite end, the bar 35 has two hooks or hook-shaped portions 67 and 68, each of which is adapted for driving engagement with the element 36. The element 36 is adapted to engage the hook-shaped portion 67 for pulling its bar 35 (Figures 7 and 12) and to engage the hook-shaped portion 68 for pushing its bar 35 (Figure 17).

Drive connecting element

The element 36 is adapted to be substantially continuously driven throughout a complete container transfer operation whereby the container transfer operation proceeds to completion and without appreciable interruption once the transfer equipment is connected to the container C and the motor 20 is started. During the first and last stages of each transfer operation, the element 36 is driven by the slide 34 and the latter is driven by the chain 33. During an intermediate stage of each transfer operation, the element 36 is driven by the chain 33 with the slide 34 in an idle position, the element 36 thereby being shifted from the rearward end to the forward end of the arm 34.

The element 36 may comprise a casting (Figure 8) having as integral parts thereof a pin-like part 71 for engagement with the hooks (67, 68) of the push-pull bar 35, side lugs 72 for engagement with the arm keepers 59 (Figure 10) in driving relation, a substantially rectangular section 73 to be engaged and driven by a lug or lugs on the chain 33, and legs 74 for rotatably supporting rollers 76. The element 36 and the arm or slide 34 are assembled (see Figure 11) with the rollers 76 received within the grooves or guideways 58 and the side lugs 72 overlying the notched bars 57. The element 36 may be shifted from end to end of the arm 34 with the rollers 76 riding in the guideways 58. At either end of the arm 34, its driving engagement with the element 36 may be established by placing the side lugs 72 in the corresponding recesses or keepers 59 (see full line position of Figure 22) or by placing the element 36 in abutting relation with the corresponding transverse member (see 62, 63 and Figures 12 and 17). Thus the element 36 is shiftable along the arm 34 into any one of four positions for driving relation with the arm 34. In one position (Figure 12), the element 36 engages the transverse member 62 in driving relation. In a second position (Figure 15 and full line position of Figure 22), the side lugs 72 of the element 36 engage in driving relation the opposite notches or keepers 59 at the right hand end of the arm 34. In a third position (Figure 17 and dotted line position of Figure 22), the element 36 engages the transverse member 63 in driving relation. In a fourth position (Figures 20, 21), the side lugs 72 of the element 36 engage in driving relation the opposite notches or keepers at the left hand end of the arm 34. When the element 36 is shifted along the arm 34 either accidentally or by the chain 33, its side lugs 72 overlie the arm side bars 57 and by engagement therewith prevent the element 36 from accidentally falling onto the chain 33. Movement of the element 36 from one to the other end of the arm 34 is provided by the chain 33 as will be more fully described hereinafter.

*Slide locks*

In each container transfer operation, the forward transverse member (62 or 63) of the arm 34 is first driven by the chain 33 with the element 36 at the rearward end of the arm 34 and driven by the corresponding transverse member (62 or 63) of the arm 34. This drive of the arm 34 and the element 36 continues until the arm 34 reaches a position adjacent the far side of the trailer frame D with respect to the direction of the transfer operation. Drive of the arm 34 is then temporarily discontinued by disengagement with the chain 33. The arm 34 remains stationary, while the chain 33 drives the element 36 from adjacent the rearward end to adjacent the forward end of the arm 34. During such drive of the element 36, the arm 34 is engaged by a set of two locking pawls 77 (see Figure 5) and held thereby against forward movement which might otherwise occur due to the drag of the element 36 on the arm 34 as the element side lugs 72 and the rollers 76 move along the notched bars 57 and the guideways 58 respectively. This arm locking operation of a set of pawls 77 also insures the element 36 being properly positioned at the forward end of the arm 34 by the chain 33. The element 36 as it moves into position at the forward end of the arm 34 engages the set of pawls 77 locking the arm 34 to release the locked arm 34 for further forward movement. The chain 33 next disengages the element 36 and engages the rearward arm transverse member (62, 63) to drive the arm 34 forward with the element 36 having its side lugs 72 engaging the forward arm notches or keepers 59 in driving relation. A set (two) of these locking pawls 77 is arranged adjacent each end of a drive transmitting mechanism 26 as shown in Figure 6. The pawls 77 of each set are also arranged at opposite sides of the drive transmitting mechanism as illustrated in Figure 6, so that in each arm locking operation, the forward end of the arm 34 is locked in the same manner at each side thereof. The set of pawls 77 at the left in Figure 6 are effective to lock the arm 34 by engagement with the forward arm apertures 61 in the travel of the arm to the left (Figure 6). The other set of pawls 77 (at the right in Figure 6) operates in similar manner, being effective to lock the arm 34 in its travel to the right (Figure 6). The four pawls 77 (arranged in two sets) are all of the same construction (see Figure 9), are similarly mounted (see Figures 6 and 11), and operate in the same manner. It is, therefore, sufficient here to describe the construction, mounting and operation of but one of the pawls 77.

A locking pawl 77 (see Figure 9) has a hinge portion 78 connected by a web portion 79 to a cylindrical portion 81 having at the forward end a conically shaped nose 82. The underside of the nose 82 and the forward end of the cylindrical portion 81 is cut away as shown in Figures 9 and 11. The rearward end of the cylindrical portion 81 provides sufficient weight to cause the pawl 77 to pivot to the normal or locking position (see Figures 2 and 5 and dotted line position of Figure 11) under gravity action. Each pawl 77 is pivotally connected by a hinge pin to a bracket 83 which is welded or otherwise secured to the vertical web of an angle iron 27 (see Figure 11). This angle iron 27 is provided with an opening or aperture 84 through which the locking portion of the pawl 77 is adapted to move in arm locking and releasing operations (see Figure 2, 3, 4, 5 and 11). Movement of the pawl 77 into its normal or locking position is limited by engagement of the forward edge of the pawl web portion 79 with the adjacent face of the angle iron 27 (see Figure 11).

In the normal position of a pawl 77 (Figure 2), the pawl nose 82 is in the path of movement of a pawl tripper 66 (Figure 3) at the near end and corresponding side of the arm 34. Thus the arm 34, as it moves into a position opposite the pawl 77, is adapted to rock the pawl 77 to a retracted (arm releasing) position in the manner illustrated by Figures 3 and 4 wherein an arrow indicates the direction of travel of the arm 34. In the pawl-retracting operation by the forward end of the arm 34, a forward pawl tripper 66 engages the tapered or conical pawl nose 82 in a cam-like action (Figure 3) and forces the pawl 77 to a partially retracted position (Figure 4). The pawl nose 82 is then engaged by the forward edge 86 of the adjacent arm side 56 (Figure 4), which engagement in a cam-like action forces the pawl 77 to fully retracted position (full line position of Figure 11) as the arm 34 continues to move forward, that is, in the direction indicated by the arrow in Figure 4. The pawl 77 remains in the fully retracted position as long as it engages the outer face 85 of the adjacent arm plate 56. The pawl 77 returns to its normal position under gravity action as the corresponding forward arm opening 61 arrives at a position opposite the pawl nose 82 to lock the arm 34 against further forward movement, that is, in the direction indicated by the arrow in full lines of Figure 5. The arm opening 61 is so positioned as to register with the angle bar aperture 84 during travel of the arm 34. When the arm opening 61 registers with the angle beam aperture 84 (see Figure 5), the forward end of the cylindrical section 81 under the gravity action of the pawl 77 extends through the angle beam aperture 84 and into the arm opening 61 to lock the arm 34 against further forward movement. In the pawl position of Figure 5, the pawl nose 82 extends out of the arm aperture 61 and into the path of movement of the corresponding roller 76 of the element 36 to provide for movement of the pawl 77 to unlocking position for releasing the arm 34.

When a pawl 77 is in the position of Figure 5, the arm 34 is locked at its forward end against further forward (outward) movement (see solid line arrow), but is free to move in the reverse direction, that is, inwardly (see broken line arrow). Release of the arm 34 from locking engagement with the pawl 77 is controlled by the element 36. When the forward travel of the arm 34 is discontinued and the arm 34 is locked as in Figure 5, the chain 33 drives the element 36 from the rearward end to the forward end of the arm 34. Figure 5 shows a roller 76 in position as the element 36 nears the forward arm end. As the element 36 moves into its forward arm position, the roller 76 engages the pawl nose 82 and shifts the pawl 77 sufficiently to withdraw the cylindrical pawl portion 81 from the arm aperture 61 and release the arm for forward movement (solid line arrow Figure 5), in which the arm aperture edge 89 engages the pawl nose 82 and forces the pawl 77 completely to one side of the arm 34. In the further forward movement of the arm 34, it is driven by the chain 33 with the nose 82 of the pawl 77 resting against the face 85 of the arm 34 and remaining in a retracted or out-of-the-way position.

As previously mentioned, the pawl 77, with the arm 34 positioned as in Figure 5, is ineffective to prevent movement in the direction indicated by the broken line arrow (Figure 5). In such movement of the arm 34, the pawl 77 is swung to the retracted or out-of-the-way position by engagement of the nose 82 with first the inner edge 87 of the corresponding pawl tripper 66 and then the edge 88 of the arm aperture 61 (Figure 5). In the continuation of such arm movement (see broken line arrow of Figure 5), the pawl 77 passes through the positions of Figures 4 and 3 (taken in the order named) and returns to the normal position thereof (Figure 2).

OPERATION FOR LOADING TRUCK TRAILER

The truck trailer is parked adjacent and parallel to the platform B as illustrated in Figure 1. The skid bridges d are secured in place with the channels b and c and the bridges d in alignment and register to form substantially continuous skid guides (Figure 1). The outer end of each push-pull bar 35 is suitably secured to the freight container C. The other end of each push-pull bar 35 is connected to the arm 34 of its drive transmitting mechanism 26 as illustrated in Figures 1, 7 and 12. The attendant now operates an electrical switch or other suitable device of conventional form (not shown) to start the motor 20 and drive the chain 33 of each drive transmitting mechanism 26 in the direction indicated by the arrow of Figure 12. The motor control (not shown) may be a conventional button operated electrical switch, which is closed when a container transfer operation is to be initiated and which normally is again opened only when the container is completely transferred and in proper position on the truck trailer frame D. Thus the attendant need only maintain the switch button in depressed position in order to accomplish the complete transfer of the container C from the platform B (Figures 1 and 12) to the truck trailer frame D (Figure 16). The two drive transmitting mechanisms 26 operate simultaneously and in the same manner. This invention will, therefore, be understood from an explanation of the operation of but one of these mechanisms 26.

As the chain 33 is driven in the direction indicated by the arrow of Figure 12, its lug 51 engages the forward cross piece 63 of the arm 34 and pushes or drives the arm 34 to the right. The element 36 engages the hook-shaped portion 67 of the bar 35 to establish a driving relation therebetween with the element 36 pulling the bar 35. As the arm 34 begins its travel to the right, engagement of the bar 35 and the element 36 rocks the element 36 anticlockwise (Figure 12) until the element 36 assumes a stationary position on the arm 34 by reason of its (36) engagement with the rearward arm cross piece 62 and the arm bars 57 and the engagement of the rollers 76 of the element 36 with the upper sides of the guideways 58. (A corresponding position for the element 36 when the latter is at the opposite end of the arm 34 is shown in dotted lines in Figure 22.) The side lugs 72 of the element 36 are now in a retracted position with respect to the adjacent keepers 59 (the notches in the arm bars 57). This relative arrangement of the arm 34, the element 36 and the bar 35 may be maintained as the arm 34 travels to the right and until the arm 34 reaches the position of Figure 14. The chain lug 51 is so spaced from the chain lug 49 that the chain lug 49 passes over the top of the chain sprocket 30 slightly in advance of the transverse member 62 of the arm 34 and takes a position immediately at the rear of the element 36 (see Figure 13).

In the transfer of the container C from the position of Figure 13 to the position of Figure 14, the lug 49 may be positioned between and in spaced relation to the rearward cross piece 62 of the arm 34 and the element 36. Thus the chain lug 49 would not engage the element 36 during the drive of the arm 34 by the chain 33.

By positioning the chain lug 49 somewhat closer to the chain lug 51, the arm 34 may be driven by the chain lug 51 and the element 36 may be engaged and driven by the chain lug 49 during that part of the transfer operation illustrated by Figures 13 and 14. During such drive, the element 36 may lightly engage the rearward cross piece 62 of the arm 34, or may be slightly spaced therefrom by engagement with the chain lug 49, in which event the chain 33 would simultaneously drive the element 36 and the arm 34 separately and independently.

With the arm 34 in the position of Figures 6 and 12, the set of locking pawls 77 at the left are in retracted position and rest against the outer sides of the arm plates 56 (see full line position of pawls 77 in Figure 11). As the arm 34 travels from the position of Figures 6 and 12 to the position of Figure 14, the rearward arm openings 61 pass the set of locking pawls 77 at the left (Figure 6). At this time, the pawls 77 at the left (Figure 6) pass into the rearward openings 61 of the arm 34 in the manner shown by Figure 5. These pawls 77, however, are ineffective, as previously explained, to lock the arm 34 against continued movement which corresponds in direction to the arrow in broken lines of Figure 5.

In moving into the position of Figure 14, the forward end of the arm 34 engages the set of pawls 77 at the right (Figures 6 and 14) and shifts them to the retracted or out-of-the-way position as previously described and in the manner illustrated by Figures 3 and 4 wherein the arrow indicates the direction of travel of the arm 34. When the forward arm apertures 61 register with the arm retracted pawls 77, the latter move into locking position (Figure 5) under gravity action. The forward end of the cylindrical pawl portion 81 of each pawl (at the right Figure 6) now engages the edge 89 of the forward arm aperture 61 (Figure 5) to oppose further forward movement of the arm 34, that is movement in the direction of the arrow in solid lines (Figure 5).

The chain lug 51 drives the arm 34 until the lug (51) starts its downward travel along the chain sprocket wheel 31 (Figure 14). As the chain lug 51 moves downwardly along the sprocket wheel 31, it (51) disengages and passes under the transverse member 63 of the arm 34. At the same time as the lug 51 disengages the arm 34, the set of pawls 77 at the right (looking at Figures 6 and 14) pass into the forward end apertures 61 of the arm 34 to lock the arm 34 against continued forward movement. The chain lug 49 now drives the element 36 from the rearward (left) to the forward (right) end of the arm 34 to transfer the container C from the position of Figure 14 to the position of Figure 15. The drive of the element 36 lengthwise of the arm 34 is started substantially simultaneously with the disengagement of the arm 34 and the chain lug 51. Thus there is no interruption in the transfer of the container C. The chain lug 49 in driving the element 36 tends to tilt the latter anticlockwise (see full line position of Figure 22) so that the forward edges of the element side lugs 72 will pass over the keepers 59.

When the element 36 passes into the position relative to the arm 34 which is illustrated by Figure 15 and Figure 22 (full line position), the forward edges of the rollers 76 engage the tapered or conical noses 82 of the set of pawls 77 (at the right in Figures 6 or 15) which lock the arm 34 (see Figure 5) and force the engaged pawls 77 toward their retracted positions to release the arm 34, as previously explained. Substantially simultaneously with the release of the arm 34 from the pawls 77 by the element 36, the side lugs 72 of the element drop into the notches or keepers 59 (full line position of Figure 22). The element 36 then has driving engagement with the forward end of the arm 34 for the remainder of the container loading operation.

In the continued operation of the chain 33, the chain lug 49 disengages the element 36, passes under the element 36, and downwardly along the sprocket wheel 31. If desired, the proportioning of the element 36 and the arm 34 may be such that immediately prior to disengagement of the lug 49 and the element 36, the element rollers 76 operate the pawls 77 (at the right in Figures 6 and 15) to release the arm 34, and the element 36 then is driven a short distance to the right to engage and drive the transverse member 63 of the arm 34.

The chain lug 48 takes over the drive of the arm 34 preferably substantially simultaneously with the release of the arm 34 by the action of the element rollers 76 on the set of locking pawls 77 (at the right in Figures 6 and 15). The chain lug 48 moves into driving engagement with the transverse member 62 of the arm 34 as the chain lug 49 disengages the element 36. The chain lug 48 then drives or pushes the arm 34 until the transfer operation is completed as illustrated in Figure 16. As the chain lug 48 takes over the drive of the arm 34, the element 36 is in a rearwardly tilted position. In the movement of the arm 34 by the chain lug 48, the element 36 occupies the full line position of Figure 22 with the element side lugs 72 in the forward arm keepers 59 and the rearward edge of each keeper 59 abutting in forward driving relation the rearward edge of the corresponding element side lug 72 as shown by the full line position of Figure 22. As also shown in the latter figure, each keeper 59 is in the form of a somewhat V-shaped notch, one (the rearward) side or face having a relatively steep angle to the horizontal and being in face to face contact with the rearward edge of the corresponding element side lug 72. The other notch side or face has only a slight inclination and has face to face contact with the underside of the rearward portion of the element side lug 72.

When the container C is completely transferred or loaded (Figure 16), the attendant stops operation of the motor 20 and the two drive transmitting mechanisms 26 by opening the motor circuit as by releasing a button-operated electrical switch (not shown) for the motor circuit (not shown). It is to be understood that the arm 34 is preferably of such length that the transfer operation may be completed with the container C centered on the trailer frame D, before the rearward arm apertures 61 arrive opposite the set of locking pawls 77 at the right hand side of the trailer frame (looking at Figures 6 and 16).

The container C having been transferred to the truck trailer, the bridges $d$ (Figure 1) are disconnected from the wings $e$ and suitably stored on the truck trailer.

During hauling and trucking operations, the arms 34, the elements 36 and the push-pull bars 35 are suitably stored on the vehicle. Each push-pull bar 35 may be disconnected from both the container C and the corresponding element 36 and then placed on a suitable hanger (not shown) carried by the vehicle. The arms 34 and their elements 36 may be shifted to an out-of-the-way position within the arm guides (23, 24, 27).

If desired, the arms 34 with their elements 36 may be removed from the chains 33 by controlling the motor 20 to drive the chains 33 until the arms 34 each reach a fully extended position at a side of the vehicle and drop off the corresponding chain 33. Each arm 34 may be replaced on its chain 33 by properly positioning an end of the arm 34 on the chain 33 and operating the motor 20 so that the chain 33 will draw the arm 34 into the arm guides.

Since the gearing 22 includes worm and worm wheel gearing, it provides a self-locking means for the drive of the chains 33 and the arms 34 when the motor 20 is not operating.

UNLOADING THE TRAILER

The operation of unloading the truck trailer is substantially the same as the described and illustrated loading operation. It is to be noted, however, that in an unloading operation, each element 36 engages the hook-shaped portion 68 of the corresponding push-pull bar 35 and pushes the latter.

Successive stages in an unloading operation are illustrated by Figures 17 through 21 which correspond respectively to the previously described Figures 12 through 16. While Figures 12 through 16 show the element 36 tilted to the left and Figures 17 through 21 show the element 36 tilted to the right, it is to be noted that in all cases the element 36 is tilted rearwardly with respect to the direction of travel of the element 36 and the associated arm 34.

The pawls 77 at the right side of the vehicle (looking at Figures 6 and 17 through 21) do not stop travel of the arms 34 as the latter travel from the position of Figure 17 through the position of Figure 18 to the position of Figure 19. A corresponding operation has been explained with respect to the loading operations illustrated by Figures 12, 13 and 14.

The pawls 77 at the left side of the vehicle (looking at Figures 6 and 17 through 21) lock the arms 34 against forward movement during travel of the elements 36 along the arms 34 as illustrated in Figures 19 and 20. A corresponding locking operation has been explained in the description of that part of a loading operation illustrated by Figures 14 and 15.

The arm releasing and driving operations in completing the unloading of the container C correspond to the similar operations described in the explanation of Figures 15 and 16.

The broken line position of the element 36 in Figure 22 illustrates its relative arrangement with respect to its arm 34, during travel of the arm 34 from the position of Figure 17 to the position of Figure 19. In the broken line position illustrated in Figure 22, the element is tilted to the right (rearwardly) with the forward edges of its side lugs 72 in elevated position and the rearward edges of its side lugs 72 resting on the bars 57 and abutting the transverse member 63 of the arm 34 in driving relation whereby the arm 34 pushes the element 36.

In both loading and unloading operations, the chain lugs 49 and 51 may be used. However, in unloading operations (assuming the truck trailer to be unloaded at the same side it is loaded), the chain lug 52 may be used, and the chain lug 49 need not be used. The relative spacing of the chain lugs 52 and 51 corresponds to the spacing of the chain lugs 48 and 49. Thus, in unloading the container C, the lug 49 first drives the arm 34, then the lug 51 drives the element 36, and finally the lug 52 drives the arm 34 as illustrated in Figures 17 through 21.

It is readily apparent from the above description of this invention and the accompanying drawings that the truck trailer frame D may be loaded or unloaded from either side thereof by means of the illustrated drive transmitting mechanisms 26 and in the manner already explained.

MODIFICATION OF ELEMENT

A second form 91 of the element which transmits the drive of an arm 34 and a chain 33 to a push-pull bar 35 is illustrated in Figure 23. The element 91 of Figure 23 is adapted for use in the same manner as described for the element 36 of, for example, Figures 8 and 22 and with the previously described arm 34 and push-pull bar 35. The element 91 of Figure 23 has a pin-like portion 92 for connection with the push-pull bar 35 and legs 93 (corresponding to the legs 74 of Figure 8) for supporting rollers which ride in the roller guideways 58. The element 91, however, has a separate and removable bar 94 which serves the purpose of the side lugs 72 of the element 36. The bar 94 extends through an opening in a yoke-like part of the element 91 and has its opposite ends overlying the two bars 57 of the arm 34. As shown in Figure 23, each notch or keeper 96 may be of rectangular shape in lieu of the shape of the notches 59 shown in Figure 10.

When the arm 34 is traveling in the direction of the arrow in solid lines (see Figure 23) and the element 91 is in the full line position, the rearward edge of each end of the bar 94 rests in a notch 96, and the arm 34 drives the element 91 through the bar 94. In the reverse direction of travel of the arm 34 (see dotted line arrow of Figure 23), the element 91 is tilted rearwardly into driving engagement with the transverse member 63 and the bar 94 is held in position above the two opposite notches 96. The element 91 is thus ready to be driven by a chain lug to the opposite end of the arm 34. Except for the described differences in construction and operation, the elements 36 and 91 are constructed and operate in substantially the same manner.

It is to be understood that the foregoing is illustrative and that this invention includes all modifications and embodiments coming within the scope of the appended claims.

I claim:

1. In equipment for transferring freight containers to or from a vehicle, the combination comprising: an elongated member adapted for longitudinal, rectilinear movement on the vehicle, means adapted for connection to a container to be transferred, said means being also adapted to engage and be driven by said member and to be shifted therealong from one to a second driving position thereon, and means adapted for mounting on the vehicle for selectively cooperating with said member and said connection means in a continuous operation of said selective means to engage and drive said member and thereby drive said connection means in said one position, then to disengage said member and engage said connection means for shifting said connection means from said one to said second of said positions on said member, and then to disengage said connection means and engage and drive said member with said connection means in said second position and driven by said member.

2. Equipment as recited in claim 1, wherein means are provided for locking the member to preclude movement thereof by the connection means during the shifting of said connection means relative to said member by the driving means, said locking means being operable by said connection means to release said member.

3. In freight container transfer equipment for a vehicle, the combination comprising: an elongated member mounted on the vehicle for forward travel in a substantially longitudinal direction along a substantially rectilinear path, means adapted for connection to a container to be transferred relative to the vehicle, said means being movable lengthwise of said member from one position relative to said member to a second and more forward position relative to said member and being adapted in both of said positions to be engaged and driven by said member in said forward direction of travel, and propelling means mounted on the vehicle, said propelling means being adapted in a continuous operation thereof to selectively engage and selectively disengage said member and said movable means separately and individually for driving said member forward with said member driving said movable means and driving said movable means from said one position to said second position relative to said member.

4. In freight container transfer equipment for a vehicle, the combination comprising: an elongated member mounted on the vehicle for forward travel in a substantially longitudinal direction along a substantially rectilinear path, means adapted for connection to a container to be transfered relative to the vehicle, said means being movable relative to and lengthwise of said member from one position adjacent the rearward end of said member to a second position adjacent the forward end of said member and being adapted in both of said positions to engage said member in driving relation for travel therewith in said forward direction, chain guiding means carried by the vehicle adjacent opposite sides thereof, and a propelling chain adapted to be driven lengthwise with the chain guided by said chain guiding means, said chain being adapted in one direction of travel thereof to engage and drive said member forward along said path and from a position extending outwardly of one of said chain guiding means to a position extending outwardly of the other of said chain guiding means and being further adapted to disengage said member and to shift said movable means along said member from said one position to said second position thereof on said member with said member intermediate said outwardly extending positions.

5. In freight container transfer equipment for a vehicle, the combination comprising an elongated member mounted on the vehicle for substantially longitudinal travel along a substantially rectilinear path, means movable lengthwise of said member from a first position adjacent the rearward end of said member to a second position adjacent the other end forward end of said member and adapted in both of said positions to engage and be driven in the same direction by said member, said movable means being adapted to be connected to a container to be transferred to or from the vehicle, and driving means adapted to engage and drive said member in said direction and thereby drive said movable means in either of said positions to shift the container relative to the vehicle and adapted to engage and move said movable means in said direction relative to said member from said first position to said second position and thereby drive said movable means to shift the container relative to the vehicle, said driving means including a propelling chain and guides for said chain adjacent the limits of the reach of said chain, said guides being mounted on the vehicle and stationed adjacent opposite sides thereof.

6. In equipment for transferring freight containers to or from a vehicle, the combination comprising an arm for longitudinal, rectilinear movement on the vehicle, an element adapted to engage and be driven by said arm and also to be shifted therealong from a first position adjacent the rearward end of said arm to a second position adjacent the other and forward end of said arm and adapted in both of said positions to engage and be driven in the same direction by said arm, a bar adapted to transmit the drive of said element to a freight container, and means adapted to be mounted on the vehicle for selectively cooperating with said arm and said element to engage and drive said arm forward and thereby drive said element and bar with said element in said first position, then to disengage said arm and engage said element for driving said element and said bar to shift said element from said first to said second position on said arm, and then to disengage said element and engage and drive said arm forward with said element in said second position and driven by said arm.

7. Equipment as recited in claim 6, wherein means are provided for locking the arm to preclude movement thereof by the element during the shifting of said element relative to said arm, said locking means being operable by said element to release said arm from said locking means.

8. In freight container transfer equipment for a vehicle, the combination comprising an arm mounted on the vehicle for substantially longitudinal travel in a substantially rectilinear path on the vehicle, a push-pull bar adapted at one end for connection to a container, an element adjustably carried by said arm and adapted for connection to the other end of said push-pull bar, said element being adapted for positioning adjacent either end of said arm for releasable driving engagement therewith and for movement relative to said arm from one to the other of said positions, a propelling chain mounted on the vehicle, and a plurality of lugs on said chain, one of said chain lugs being adapted to engage and drive forward said arm along said path with said element in the rearward arm position and driven by said arm, a second of said chain lugs being adapted to engage and drive forward said element to shift said element lengthwise of said arm from said rearward arm position to the forward arm position, and a third of said chain lugs being adapted to engage and drive forward said arm with said element in said forward arm position and said element driven by said arm.

9. In freight container transfer equipment for a vehicle, the combination comprising: an arm adapted for travel on the vehicle in a substantially longitudinal direction along a substantially rectilinear path in a container transfer operation, an element adapted for travel with said arm and to be driven thereby with said element positioned adjacent either end of said arm, said element being adapted for connection to a freight container in driving relation, locking means at a station intermediate the end limits of said path and adapted to engage said arm at said station and preclude forward movement thereof along said path, and means adapted to be mounted on the vehicle for selective engagement with said arm and said element to drive said arm from one end to the other end of said path and to shift said element lengthwise of said arm from the position thereof adjacent the rearward end to the position thereof adjacent the forward end of said arm with said arm intermediate the end limits of said path and held by said locking means, said locking means being adapted to be released by said element in the shifting movement thereof into said forward arm end position.

10. In freight container transfer equipment for a vehicle, the combination comprising: an arm adapted for travel on the vehicle in a substantially longitudinal rectilinear path in a container transfer operation, an element adapted for travel with said arm and to be driven thereby with said element positioned adjacent either end of said arm, means adapted to connect said element and a freight container in driving relation, locking means at a station intermediate the end limits of said path and adapted to engage said arm at said station and preclude forward movement thereof along said path, a guide stationed adjacent said locking means and mounted on the vehicle, a longitudinally driven flexible member extending parallel to said path and also trained over and downwardly of said guide, and a plurality of lugs carried by said flexible member and spaced therealong, one of said lugs being adapted to engage said arm adjacent the forward end thereof and drive said arm along said path and toward said guide, said one lug in traveling downwardlly along said guide being adapted to disengage said arm, a second of said lugs being then adapted to drive said element lengthwise of said arm and from a position adjacent the rearward end thereof to a position adjacent the forward end thereof, said locking means being effective to preclude forward movement of said arm as said element is driven lengthwise of said arm by said second lug, said locking means being operated by said element in the movement thereof into the position adjacent the forward end of said arm to release said arm for forward movement, said second lug in traveling downwardly along said guide being adapted to disengage said element, and a third of said lugs being then adapted to engage said arm adjacent the rearward end thereof and drive said arm forward.

11. In freight container transfer equipment for a vehicle, the combination comprising: an arm shiftably mounted on the vehicle, an element shiftably mounted on said arm and adapted in at least two positions on said arm to be driven thereby, means for connecting said element to a container in driving relation, means on the vehicle for engaging and driving said arm in the lengthwise direction thereof and for engaging and shifting said element along said arm from one end thereof to the other end thereof, and means on the vehicle to engage said arm for holding said arm stationary as said element is shifted along said arm by said driving means, said arm holding means being adapted to be controlled by said element to release said arm for movement by said driving means.

12. In freight container transfer equipment for a vehicle, the combination comprising: propelling means on the vehicle; and means including an arm and an element for transmitting the drive of said propelling means to a container to be transferred relative to the vehicle; said arm having longitudinal members provided with longitudinally extending guides for said element, transverse members adjacent the opposite ends of said arm and connecting said longitudinal members, and keepers adjacent each end of said arm and positioned inwardly of said transverse members; said element being guided by said guides for shifting movement lengthwise of said arm, being adapted to abut and be driven by either of said arm transverse members, and being adapted to engage said keepers in driving relation, whereby said element is shiftable lengthwise of said arm and into four positions for driving engagement with said arm.

13. Equipment as recited in claim 12, wherein the propelling means in a continuous operation thereof is adapted to selectively engage and disengage the arm and the element to drive selectively said arm and said element and to shift said element lengthwise of said arm with said arm disengaged by said propelling means.

14. In freight container transfer equipment for a vehicle, the combination comprising: propelling means on the vehicle; and means including an arm and an element for transmitting the drive of said propelling means to a container to be transferred relative to the vehicle; said arm having longitudinal side members each provided on the inner face thereof with a longitudinally extending locking bar having notches arranged in spaced relation lengthwise thereof, and transverse members connecting said side members adjacent the opposite ends of said arm and adapted to straddle said propelling means for selective driving engagement therewith; said element being carried by said arm and guided thereby for movement therealong, being adapted for selective engagement and disengagement by said propelling means in the operation thereof, having lugs overlying said locking bars for engagement with said notches in driving relation, being adapted for engagement with said transverse members in driving relation, and being shiftable and guided lengthwise of said arm for selective positioning relative to said transverse members and said notches.

15. In freight container transfer equipment for a vehicle, the combination comprising: propelling means on the vehicle; and means including an arm and an element for transmitting the drive of said propelling means to a container to be transferred relative to the vehicle; said arm having longitudinal side members each provided with a longitudinally extending guideway and a longitudinally extending locking bar having notches arranged in spaced relation, and transverse members connecting said side members adjacent the opposite ends of said arm; said element extending into the guideways of both of said side members, having laterally extending lugs overlying said locking bars for engagement with said notches in driving relation, being adapted for engagement with said transverse members in driving relation, and being shiftable and guided lengthwise of said arm for selective positioning relative to said transverse members and said notches.

16. In freight container transfer equipment for a vehicle, the combination comprising an arm adapted for movement in opposite directions on and relative to the vehicle, a locking member effective with said arm in a predetermined position to lock said arm against movement in one of said opposite directions, and an element adapted for connection with a container and mounted on said arm for movement relative thereto for operating said member to release the locked arm for movement in said one direction.

17. In freight container transfer equipment for a vehicle, the combination comprising an arm adapted for movement in opposite directions on and relative to the vehicle, a locking pawl mounted on the vehicle and extending into the path of travel of said arm, said pawl being effective to engage said arm to lock said arm against movement in one of said directions, an element associated with said arm for driving engagement therewith, said element being also shiftable relative to said arm and effective to operate said pawl to release the locked arm for movement in said one direction, and means on the vehicle for selective engagement with said arm and said element to successively drive said arm and shift said element relative to said arm.

18. In freight container transfer equipment for a vehicle, the combination comprising: an arm adapted for longitudinal movement on the vehicle in opposite directions and having an aperture opening into a guideway extending longitudinally of said arm, a locking member mounted on the vehicle and stationed to register with said aperture in one position of said arm, said member in said one position of said arm being adapted to project through said aperture and into said guideway to lock said arm against longitudinal movement in at least one direction, and an element carried by said arm and shiftable relative thereto with said element guided by said guideway, said element in shifting relative to said arm being adapted to engage said member to release said arm from said member.

19. In freight container transfer equipment for a vehicle, the combination comprising: an arm adapted for longitudinal movement on the vehicle in opposite directions and having an aperture opening into a guideway extending longitudinally of said arm, a locking member mounted on the vehicle and stationed to register with said aperture in one position of said arm, said member in said one position of said arm being adapted to project through said aperture and into said guideway to lock said arm against longitudinal movement in at least one direction, and an element adapted for driving connection with a container to be transferred, said element being adapted to be driven by said arm and being adapted to be shifted relative to said arm and lengthwise thereof, said element extending into said guideway to be guided thereby in shifting relative to said arm and to engage said member in said guideway to effect release of said arm from said member.

20. In freight container transfer equipment for a vehicle, the combination comprising: an arm adapted for longitudinal movement on the vehicle in opposite directions and having an aperture opening into a guideway extending longitudinally of said arm, a locking member mounted on the vehicle and stationed to register with said aperture in one position of said arm, said member in said one position of said arm being adapted to project through said aperture and into said guideway to lock said arm against longitudinal movement in at least one direction, an element carried by said arm and shiftable relative thereto with said element guided by said guideway, said element in shifting relative to said arm being adapted to engage said member in said guideway to release said arm from said member, and a propelling chain mounted on the vehicle and having lugs for selectively engaging and disengaging said arm and said element to drive said arm to said position, to shift said element relative to said arm with said arm in said position and to drive said arm beyond said position following the release of said arm by said member.

21. In freight container transfer equipment for a vehicle, the combination comprising: an arm on the vehicle and adapted for longitudinal movement in opposite directions and having an aperture opening into a guideway extending longitudinally of said arm, a gravity actuated pawl pivotally mounted on the vehicle and projecting normally into the path of movement of said arm, said pawl being adapted to be engaged and swung to a retracted position by said arm in said arm movement and to swing under gravity action to normal position with said pawl extending through and beyond said aperture in one position of said arm for locking said arm therein, and an element adapted for connection to a freight container in driving relation and adapted to be driven by said arm, said element being further adapted to be shifted lengthwise of said arm with said element guided by said guideway to engage said pawl in said arm locking position for releasing said arm.

22. In freight container transfer equipment for a vehicle, the combination comprising: a slide having apertures in each side thereof and adjacent each end thereof, a guide on the vehicle for said slide to provide a path of rectilinear movement for said slide, a locking member adjacent each side and end of said slide guide for slide locking engagement within one of said arm apertures, and an element adapted for detachable connection to a container to be transferred and adapted to be driven by said slide, said element being shiftable along and lengthwise of said slide from one to another driving position thereon and in so shifting being adapted to effect release of said arm from locking members having locking engagement therewith.

23. In freight container transfer equipment for a vehicle, the combination comprising: a slide having apertures in each side thereof and adjacent each end thereof, a guide on the vehicle for said slide to provide a path of rectilinear movement for said slide, a locking member adjacent each side and end of said slide guide for slide locking engagement within one of said arm apertures, an element adapted for detachable connection to a container to be transferred and adapted to be driven by said slide, said element being shiftable along and lengthwise of said slide from one to another driving position thereon and in so shifting being adapted to effect release of said arm from locking members having locking engagement therewith, and means adapted for selective disengageable driving connection with said slide and with said element to drive said slide with said slide driving said element and to shift said element along said slide with said slide adjacent an end of said guide and locked by the adjacent locking members.

RAGNAR A. NORBOM.